United States Patent [19]

Michels et al.

[11] Patent Number: 5,372,731
[45] Date of Patent: Dec. 13, 1994

[54] COMPOSITION AND PROCESS FOR THE FINISHING OF TEXTILES

[75] Inventors: Gisbert Michels, Cologne; Hans-Albert Ehlert, Leverkusen; Hans-Josef Laas, Cologne; Joachim Probst; Helmut Reiff, both of Leverkusen; Rolf-Volker Meyer, Krefeld, all of Germany

[73] Assignee: Bayer Aktiengesellschaft, Leverkusen, Germany

[21] Appl. No.: 25,488

[22] Filed: Mar. 3, 1993

[30] Foreign Application Priority Data

Mar. 12, 1992 [DE] Germany ............... 4207851

[51] Int. Cl.$^5$ .................. D06M 11/58; D06M 11/67; D06M 11/73
[52] U.S. Cl. ..................... 252/8.8; 252/8.6; 252/8.75; 524/196; 524/197; 8/192
[58] Field of Search ............ 252/8.6, 8.75, 8.8; 524/196, 197; 8/192

[56] References Cited

U.S. PATENT DOCUMENTS

| | | | |
|---|---|---|---|
| 3,356,628 | 12/1967 | Smith et al. | 260/29.6 |
| 3,639,157 | 2/1972 | Wunder et al. | 117/139.5 A |
| 3,759,874 | 9/1973 | Gresham | 260/77.5 |
| 4,477,498 | 10/1984 | Deiner et al. | 427/389.9 |
| 4,636,545 | 1/1987 | Konig et al. | 524/457 |
| 4,663,377 | 5/1987 | Hombach et al. | 524/196 |
| 4,834,764 | 5/1989 | Deiner et al. | 8/115.64 |
| 5,171,877 | 12/1992 | Knaup et al. | 560/26 |

FOREIGN PATENT DOCUMENTS

| | | |
|---|---|---|
| 73364 | 3/1983 | European Pat. Off. . |
| 0156155 | 10/1985 | European Pat. Off. . |
| 196309 | 10/1986 | European Pat. Off. . |
| 206059 | 12/1986 | European Pat. Off. . |
| 0273449 | 7/1988 | European Pat. Off. . |
| 0283892 | 9/1988 | European Pat. Off. . |
| 0340797 | 11/1989 | European Pat. Off. . |
| 0435220 | 7/1991 | European Pat. Off. . |
| 1419505 | 1/1969 | Germany . |
| 4136618 | 5/1993 | Germany . |
| 933512 | 8/1963 | United Kingdom . |
| 1444933 | 4/1976 | United Kingdom . |
| WO93/01349 | 1/1993 | WIPO . |

OTHER PUBLICATIONS

Chemical Abstracts, vol. 98, 98:199795q, 1983, 199798, p. 69.
German Patent Application, P 4 136,618 of Nov. 7, 1991 (in English language).

Primary Examiner—Paul Lieberman
Assistant Examiner—M. Kopec
Attorney, Agent, or Firm—Sprung Horn Kramer & Woods

[57] ABSTRACT

Textiles can be finished in a wash- and cleaning-resistant manner by impregnation if aqueous dispersions are employed for this purpose which contain reactive copolymers and/or cocondensates having perfluoroalkyl groups and water-dispersible polyisocyanate mixtures whose NCO groups are not blocked.

1 Claim, No Drawings

COMPOSITION AND PROCESS FOR THE FINISHING OF TEXTILES

BACKGROUND OF THE INVENTION

1. Field of the Inveniton

The present invention relates to compositions and a process for obtaining improved wash- and cleaning-resistant textile finishes by impregnation with aqueous dispersions of customary reactive copolymers or condensates containing perfluroalkyl radicals, with simultaneous use of water-dispersible polyisocyanate mixtures whose NCO groups are not blocked.

2. Description of the Related Art

Oil- and water-repellent finishing with very different reactive polymers or condensates which contain perfluoroalkyl groups has been disclosed (European Offenlegungsschrift 073,364; U.S. Pat. No. 3,356,628). These finishes can be combined with known finishing compositions, it being possible in particular to mention methylolated compounds, but also diisocyanates. It is disadvantageous here that finishing with the diisocyanates must be carried out from solvents (aqueous emulsions are unstable) and the improvement in the cleaning resistance remains insufficient.

As a further development, EP 0,196,309 furthermore discloses that oil- and water-repellent finishes having reactive polymers or condensates which contain perfluoroalkyl groups can be obtained in aqueous dispersion with compounds containing isocyanate groups, the compound containing isocyanate groups having to be present completely in blocked form. It is disadvantageous in this case that the compounds containing isocyanate groups contained in the aqueous dispersion are present in blocked form, such that for the release of the isocyanates treatment at a temperature of 150° C. for a period of 2.5 to 5 min is necessary. The release of the blocking or masking agents, which can pass into the waste air, is also disadvantageous for reasons of toxicology and occupational hygiene.

It was therefore desirable to provide wash- and cleaning-resistant textile finishes having reactive copolymers or cocondensates containing perfluoroalkyl radicals which can be applied from aqueous dispersion, can be cross-linked at low temperatures and which have a better environmental compatibility.

SUMMARY OF THE INVENTION

It has now been found according to the invention that wash- and cleaning-resistant textile finishes having reactive copolymers or cocondensates containing perfluoroalkyl radicals are obtained from aqueous dispersion when water-dispersible, non-blocked polyisocyanate mixtures are employed as crosslinking agents which, in contrast to compounds containing isocyanate groups in blocked form, can be employed under mild reaction conditions and without the harmful release of a masking agent.

DETAILED DESCRIPTION OF THE INVENTION

The reactive copolymers and copolycondensates containing perfluoroalkyl groups, which as reactive groups contain OH or OR groups in which R denotes an alkyl radical having 1 to 3 C atoms, are adequately known to the person skilled in the art (see, for example, German Auslegeschrift 1,419,505).

In general, they are copolymers based on vinyl esters, in particular vinyl acetate and acrylic acid esters, in particular butyl acrylate. Suitable comonomers in this case are very distinct compounds, such as other acrylares, for example ethyl, methyl or 2-ethylhexyl acrylates, ethylene, styrene, acrylamide and acrylonitrile, which can also contain small amounts of monomers containing carboxyl groups, for example iraconic acid and (meth)acrylic acid, or monomers having several double bonds, for example butanediol diacrylate, in copolymerised form. These copolymers contain customary monomers having perfluoroalkyl groups in copolymerised form, it also being perfectly possible for these monomers to be the main component. As reactive groups, the copolymers containing perfluoroalkyl groups used contain N-methylol or N-methylol-($C_1$- to $C_3$-alkyl) ether groups which are incorporated by the use of methylolated and optionally etherified (meth)acrylamides or a allyl carbamates in the copolymer. In addition, however, comonomers containing OH groups, for example hydroxyalkyl (meth)acrylates, such as 2-hydroxyethyl or 2-hydroxypropyl acrylate, are very highly suitable. The monomers having the reactive groups are in general copolymerised in amounts from 2 to 20, in particular 3 to 15, % by weight, relative to the total polymer. These copolymers are prepared in a known manner, preferably by emulsion copolymerisation in aqueous medium.

As reactive compounds, reactive condensates containing perfluoroalkyl groups are used instead of or alternatively together with the copolymers. In particular, in this case these are the customary methylolmelamines or methylolureas, if appropriate etherified with $C_1$- to $C_3$-alcohols, which are present in perfluoroalkyl group-modified form. A typical representative of this group of compounds is described in European Offenlegungsschrift 073,364.

Other reactive compounds which are likewise suitable for the compositions according to the invention are likewise known to the person skilled in the art. Examples which may be mentioned are polyurethanes containing free OH groups and perfluoroalkyl groups. The term reactive copolymers containing perfluoroalkyl groups accordingly encompasses a wide field.

The water-dispersible polyisocyanates to be employed in the compositions according to the invention as crosslinker component are polyisocyanate mixtures with
a) an average NCO functionality of 1.8 to 4.2,
b) a content of (cyclo)aliphatically bonded isocyanate groups (calculated as NCO, molecular weight=42) of 12.0 to 21.5% by weight and
c) a content of ethylene oxide units (calculated as $C_2H_4O$, molecular weight=44) located in polyether chains of 2 to 20% by weight, the polyether chains on a statistical average having from 5 to 70 ethylene oxide units.

These polyisocyanate mixtures are prepared in a manner known per se by reaction of a polyisocyanate component A) having an (average) NCO functionality of 2.1 to 4.4, preferably 2.3 to 4.3, consisting of at least one polyisocyanate having exclusively (cyclo)aliphatically bonded isocyanate groups with a mono- or polyhydric polyalkylene oxide polyether alcohol B) containing on a statistical average from 5 to 70 ethylene oxide units while maintaining an NCO/OH equivalent ratio of at least 2:1, in general from 4:1 to about 1000:1. In this case, the type and amount ratios of the starting components mentioned are selected in a manner known to the person skilled in the art such that the resulting reaction products meet the conditions mentioned above in a) to c).

The polyisocyanate component A) for the preparation of the water-dispersible polyisocyanates or polyisocyanate mixtures is any desired polyisocyanate prepared by modification of simple (cyclo)aliphatic diisocyanates and having a uretdione and/or isocyanurate, urethane and/or allophanate, biuret or oxadiazine structure, such as are described, for example, in Germnan Offenlegungsschriften 1,670,666, 3,700,209 and 3,900,053 or EP Applications 336,205 and 339,396 by way of example.

Suitable diisocyanates for the preparation of such polyisocyanates are basically those in the molecular weight range 140 to 400 having (cyclo)aliphatically bonded isocyanate groups, such as, for example, 1,4-diisocyanatobutane, 1,6-diisocyanatohexane, 1,5-diisocyanato-2,2-dimethylpentane, 2,2,4- or 2,4,4-trimethyl-1,6-diisocyanatohexane, 1,10-diisocyanatodecane, 1,3- and 1,4-diisocyanatocyclohexane, 1-isocyanato-3,3,5-trimethyl-5-isocyanatomethylcyclohexane (isophorone diisocyanate) and 4,4'-diisocyanatodicyclohexylmethane or any desired mixtures of such diisocyanates.

Preferably, the starting components A) employed for the preparation of the water-emulsifiable polyisocyanates are isocyanurate groups consisting essentially of trimeric 1,6-diisocyanatohexane and, if appropriate, dimeric 1,6-diisocyanatohexane and polyisocyanate mixtures optionally containing uretdione groups and having an NCO content of 19 to 24% by weight. As component A), the corresponding polyisocyanates of the said NCO content, which contain isocyanurate groups and are largely free of uretdione groups are particularly preferably employed, as are obtained by catalytic trimerisation and with isocyanurate formation from 1,6-diisocyanatohexane in a manner known per se and which preferably have an (average) NCO functionality of 3.2 to 4.2.

The polyether alcohols B) are mono- or polyhydric polyalkylene oxide polyether alcohols containing on a statistical average 5 to 70, preferably 6 to 60, ethylene oxide units per molecule, as are accessible in a manner known per se by alkoxylation of suitable starter molecules.

To prepare the polyether alcohols B), any desired mono- or polyhydric alcohols of the molecular weight range 32 to 150, such as are also used, for example, according to EP-A 206,059, can be employed as starter molecules. Preferably, monofunctional aliphatic alcohols having 1 to 4 carbon atoms are used as starter molecules. The use of methanol is particularly preferred.

Alkylene oxides suitable for the alkoxylation reaction are particularly ethylene oxide and propylene oxide, which can be employed in the alkoxylation reaction in any desired sequence, or alternatively as a mixture.

The polyalkylene oxide polyether alcohols B) are either pure polyethylene oxide polyethers or mixed polyalkylene oxide polyethers which contain at least one polyether chain having at least 5, in general 5 to 70, preferably 6 to 60, and particularly preferably 7 to 20, ethylene oxide units in the polyether chain and whose alkylene oxide units consist to at least 60 mol %, preferably to at least 70 mol %, of ethylene oxide units.

Suitable water-dispersible polyisocyanates are, for example, those such as are described in EP-A 206,059 or German Offenlegungsschrift 4,136,618.

Furthermore, polyisocyanate mixtures having aromatically bonded isocyanate groups can also be employed for the compositions according to the invention (see EP 61,628, GB 1,444,933). This is less preferred, however.

The water-dispersible polyisocyanate mixtures are employed as crosslinking agents to obtain the wash- and cleaning-resistant textile finishes. As so-called extenders, they furthermore improve the oil- and water-repellency and in this way make possible a decrease in the amount of the compounds containing perfluoroalkyl radicals. For this purpose, amounts from 3 to 500% by weight, relative to 100% strength reactive copolymer or condensate containing perfluoroalkyl groups are necessary.

In the process according to the invention for the treatment of textiles, the described water-dispersible polyisocyanate mixtures are added without dilution to the aqueous dispersions of the compounds containing perfluoroalkyl groups. Of course, organic solvents can also be admixed with these polyisocyanate mixtures before their addition in order to reduce the viscosity. Such solvents may be, for example, ethyl acetate, acetone or methyl ethyl ketone; preferentially, however, for safety reasons high-boiling solvents, such as propylene glycol diacetate, diethylene glycol dimethyl ether, butyl diglycol acetate or methoxypropyl acetate, are employed. Whenever possible, it is preferred to do without the admixing of organic solvents.

It is also possible to prepare the polyisocyanate mixtures in the form of aqueous dispersions having a solids content of about 10 to 65% by weight. These dispersions or emulsions are prepared shortly before use according to the invention by simple mixing of the spontaneously water-dispersible polyisocyanate mixtures with water.

The water-dispersible polyisocyanate mixtures enable the preparation of stable aqueous emulsions in which a reaction of the isocyanate groups with water only proceeds slowly. It can be shown that the NCO content during the first 5 hours after emulsification has taken place only decreases by less than 10 relative % (Example I). The emulsions contain no precipitates or sediment at all even after a standing time of more than 24 hours.

Any desired sequence of addition during the preparation of the compositions according to the invention (finishing liquor) can be used. It is possible in this case both to introduce an aqueous dispersion of the compounds containing perfluoroalkyl groups and to add the water-dispersible polyisocyanate mixtures—neat or diluted by solvent or water, and to proceed in the reverse sequence. A simultaneous addition of both substances used is also possible.

The preparation is carried out in each case by simple mixing of the finishing liquor, which is stable and displays no precipitates or sediment at all. In addition to the various reactive copolymers or condensates containing perfluoroalkyl groups, other customary textile auxiliaries whose addition can be carried out even during the preparation of the finishing liquor, but, of course, alternatively only subsequently, can also be co-used in the context of the process according to the invention.

Those additives which can be mentioned are customary creaseproofing and soft-handle agents, flameproofing agents, oleophobisation agents, hydrophobisation agents, finishing agents and others. Of course, it is also appropriate, if necessary, additionally to use known hardening agents.

The process according to the invention is used for the impregnation of textiles of any type from aqueous medium. The water here is used, of course, in variable amounts, depending on whether impregnation, i.e. saturation of the material, is performed by padding, spraying, slop padding or the like. The impregnation consists of perfectly common finishing methods which are familiar to the person skilled in the art. These processes therefore require no particular explanation and reference can be made to the known literature.

To obtain wash- and cleaning-resistant textile finishes by the process according to the invention, mild reaction conditions can be selected for the crosslinking. The drying and crosslinking of the textiles impregnated from aqueous media can be carried out from temperatures of 20° C. or higher. It is of course also possible, however, to maintain temperatures of 150° C. or higher, for example up to 200° C., during the drying and crosslinking.

The compositions according to the invention are suitable for the impregnation of textiles of any type, be it in the form of woven fabrics, knitted fabrics, or nonwovens. These can be produced either from natural fibres, such as cellulose or keratin fibres, or from synthetic fibres, such as polyacrylonitrile, polyamide, polyvinyl alcohol or polyester. Of course, textile materials are also suitable which consist of mixtures of natural fibres with synthetic fibres. It is to be emphasised that by the process according to the invention even easily finished woven fabrics, such as taffeta or easily finished poplin materials, can also be finished. This is of importance, for example, for rainwear, such as anoraks and the like. Rainwear, table linen, protective working clothes and industrial textiles are preferred.

It has only become possible by means of the compositions according to the invention to finish textiles in a water- and oil-repellent manner in such a way, that these finishes are very highly resistant to washing and/or (chemical) cleaning without exhibiting the above-mentioned disadvantages.

EXAMPLES

Example I 1.0 eq. of a polyisocyanate containing isocyanurate groups, based on 1,6-diisocyanatohexane (HDI) having an NCO content of 21.5%, an average NCO functionality of about 3.8 and a viscosity of 3000 mPas (23° C.) was treated at room temperature with stirring with 0.08 eq. of a monofunctional polyethylene oxide polyether initiated in methanol and having an average molecular weight of 350 and then heated to 100° C. for 3 hours. After cooling to room temperature, a virtually colourless clear polyisocyanate mixture which can be employed according to the invention was present. The NCO content was 17.3%, the content of ethylene oxide units was 11.3% and the viscosity was 3050 mPas (23° C.).

75 g of this polyisocyanate mixture were treated with 175 g of deionised water in an Erlenmeyer flask and converted into a finely divided, bluish emulsion by gentle stirring.

As the following table shows, the NCO content in the emulsion decreased during the first 5 hours at 23° C. by less than 10 relative %.

| Standing time of the emulsion [min] at 23° C. | NCO content [%] |
|---|---|
| 5 | 5.2 |
| 60 | 5.0 |
| 120 | 4.9 |
| 180 | 4.9 |
| 240 | 4.7 |
| 300 | 4.7 |

After a standing time of 24 hours (23° C.), the emulsion was still stable. It showed no precipitations or sediment at all.

Example II 1.0 eq. of the polyisocyanate containing isocyanurate groups employed in Example I was treated at room temperature with 0,015 eq. of a monofunctional polyethylene oxide polypropylene oxide polyether initiated in n-butanol and having a content of ethylene oxide units of 80% and an average molecular weight of 2150 and the mixture was then heated at 100° C. for 1 hour. After cooling to room temperature, a faintly yellow, clear polyisocyanate mixture having an NCO content of 18.2%, a content of ethylene oxide units of 11.3% and a viscosity of 3360 mPas (23° C.) was obtained.

Example III 40 g of a monofunctional polyethylene oxide ether initiated in 3-ethyl-3-hydroxlanethyl-oxetane and of molecular weight 1210 were added with stirring to 500 g of a polyisocyanate containing isocyanurate groups and prepared by trimerisation of a part of the isocyanate groups of 1,6-diisocyanatohexane, which essentially consists of tris-(6-isocyanatohexyl) isocyanurate and its higher homologues, having an NCO content of 21.6%, a content of monomeric diisocyanate of 0.3%, a viscosity at 23° C. of 1700 mPa.s and an average NCO functionality of about 3.3 and the mixture was stirred at 100° C. for 2 hours. A clear yellow water-dispersible polyisocyanurate preparation of NCO content 19.0% and a viscosity of 2600 mPas (23° C.) was obtained.

Preparation of the compositions according to the invention

Example 1

A composition according to the invention (liquor or finishing liquor) is prepared by simple stirring of the following substances in water:
1 g/l of 60% strength acetic acid,
40 g/l of a 45% strength aqueous solution of dimethylol-4,5-dihydroxyethylene urea,
3 g/l of zinc nitrate,
30 g/l of a 16% strength aqueous dispersion of a copolymer containing perfluoroalkyl groups and having 40% by weight of fluorine in the solid (Baygard CA 40 135 from Bayer AG) and
4 g/l of the polyisocyanate mixture prepared according to Example 1.

Acetic acid, dimethylol-4,5-dihydroxyethylene urea and zinc nitrate are constituents of such finishing liquors which are familiar to the person skilled in the art.

The finishing liquor is stable for the period of textile finishing. After 24 h, neither a sediment nor even a change in the finishing liquor is to be observed. The activity after 24 h is identical to that of the freshly prepared finishing liquor.

Other compositions according to the invention are shown in the Use Examples 2 to 5 and designated as liquor.

Use Examples

In the following examples, testing of the oleophobicity was carried out by the oil-repellency test as specified in AATCC Test Herhod 118-1978; the oil repellency rating number is given. Testing of the water repellency is carried out as soecified in DIN 53 888 (testing of the water-repellent properties of textile fabrics in the spray test according to Bundesmann), the dripping-off time being given in minutes, the water-repellent effect in marks (5–1) and the water absorption in % by weight.

Example 2

A cotton fabric (130 g/m$^2$) is padded with the following liquor:
1 g/l of 60% strength acetic acid,
40 g/l of a 45% strength aqueous solution of dimethylol-4,5-dihydroxyethylene urea,
3 g/l of zinc nitrate,
30 g/l of a 16% strength aqueous dispersion of a copolymer containing perfluoroalkyl groups and having 40% by weight of fluorine in the solid (Baygard CA 40 135 from Bayer AG) and
8 g/l of the polyisocyanate mixture prepared according to Example I.

The liquor absorption is 70%. The fabric treated in this way is then dried at 100° C. for 10 min and simultaneously crosslinked. For comparison (Comparison A), finishing is carried out in the same manner without the polyisocyanate mixture prepared according to Example I, condensation being carried out at 150° C. for 5 min after drying.

The liquor absorption is 56%. The fabric treated in this way is then dried at 100° C. for 10 min and simultaneously crosslinked. For comparison, finishing (Comparison B) is carried out in the same manner with additional condensation at 150° C. in the course of 5 min. As a further comparison (Comparison C), finishing was carried out as Example 3, but without the polyisocyanate mixture prepared according to Example I.

The results can be taken from the table.

Example 4

A polyester fabric (85 g/m$^2$) is padded with the following liquor:
1 g/l of 60% strength acetic acid,
25 g/l of a 16% strength aqueous dispersion of a copolymer containing perfluoroalkyl groups and having 40% by weight of fluorine in the solid (Baygard CA 40 135 from Bayer AG) and
3 g/l of an 80% strength dilution of a polyisocyanate mixture in propylene glycol diacetate prepared according to Example I.

The liquor absorption is 55%. The fabric treated in this way is then dried at 100° C. for 10 min and simultaneously crosslinked.

Example 5

A polyamide fabric (57 g/m$^2$) is padded with the following liquor:
1 g/l of 60% strength acetic acid,
25 g/l of a 10% strength aqueous dispersion of a copolymer containing perfluoroalkyl groups and having 40% by weight of fluorine in the solid (Baygard CA 40 135 from Bayer AG) and
1 g/l of a polyisocyanate mixture according to Example I.

The liquor absorption is 45%. The fabric obtained in this way is then dried at 100° C. for 10 min and simultaneously crosslinked. The results from Examples 4 and 5 are shown in the table.

TABLE

Results of the textile finishings

| Finishing | Original Water repellency | | | | after 3 × 40° C. machine washing | | | |
|---|---|---|---|---|---|---|---|---|
| | Dripping-off time | Mark | Water absorption | Oil repellency | Dripping-off time | Mark | Water absorption | Oil repellency |
| Example 2 | 10 | 5 | 7.8 | 5 | 10 | 5 | 6.4 | 5 |
| Comparison A | 10 | 5 | 7.8 | 4 | 0 | 1 | 33.2 | 3 |
| Example 3 | 10 | 5 | 1.2 | 5 | 10 | 5 | 1.6 | 5 |
| Comparison B | 10 | 5 | 0.8 | 6 | 10 | 5 | 1.6 | 5 |
| Comparison C | 10 | 5 | 3.3 | 4 | 0 | 1 | 22.9 | 3 |
| Example 4 | 10 | 5 | 1.5 | 6 | 10 | 5 | 1.4 | 6 |
| Example 5 | 10 | 5 | 5.7 | 4 | 10 | 5 | 6.7 | 4 |

The results can be taken from the table.

Example 3

A polyester/cotton fabric (67:33; 157 g/m$^2$) is padded with the following liquor:
1 g/l of 60% strength acetic acid,
40 g/l of a 45% strength aqueous solution of dimethylol-4,5-dihydroxyethylene urea,
3 g/l of zinc nitrate,
30 g/l of a 16% strength aqueous dispersion of a copolymer containing perfluoroalkyl groups and having 40% by weight of fluorine in the solid (Baygard CA 140 135 from Bayer AG) and
2 g/l of the polyisocyanate mixture prepared according to Example I.

Example 6

A 60:40 PE/CO article having a weight of about 240 g/m$^2$, which is bleached and tinted white, is impregnated with the following impregnation liquors, squeezed off in a padder to a liquor add-on of 60% and subsequently dried at 110° C. and then condensed at 150° C. for 5 min.

The finish, which is suitable for easier soil release, is tested as follows:

The 20×20 cm test article is spotted with 5 ml of a lanolin/carbon black mixture and loaded to 2.5 kg under a glass sheet for 1 min. After an hour, the non-absorbed part is removed with a paper towel. After a period of action of 24 hours, the test article is washed at 60° C. with a household detergent containing perborate. The residual spot is assessed visually for running following the assessment with the grey scale DIN 54 002. (Mark 1–5, 1=maximum, 5=minimum). The test is carried out on the original and after five washing cycles.

The lanolin/carbon black mixture consists of 50 g of lanolin GP 6, 10 g of carbon black FW 1 (Degussa), 0.2 g of Cerise 4 B, 500 ml of ethanol and 500 ml of perchloroethylene.

The soil redeposition is tested as follows:

0.5 g of carbon black CK 3 (Degussa) is mixed to 2.0 g of Dixan detergent (Henkel) and suspended using hot water.

This mixture is stood for 4–5 hours. It is then made up to 1 l with water, stirred for 5 min with a high-speed stirrer and heated to 60° C. The test article is placed in the soiling bath and agitated therein at constant temperature for 15 mim (liquor ratio 1:50). It is then rinsed under running cold water for 5 min and then dried.

The soil redeposition is assessed by a degree of whiteness measurement evaluated according to Berger (see: E. Ganz, Whiteness Formulas: A Selection, Applied Optics 18 (1979), 1073–1078).

The following liquor was applied:

60 g/l of a dispersion of an acrylate copolymer containing perfluoroalkyl chains and having a fluorine content of about 40% by weight in the solid and about 30% by weight of solid, relative to the total dispersion; the copolymer contains polyethylene oxide methacrylate having reactive OH groups, as is described in EP 312,964.

5 g/l of the polyisocyanate mixture prepared according to Example I.

The following impregnation liquor was applied as a comparison example (Comparison D):

60 g/l of a 45% strength aqueous solution of dimethylolethyleneurea, 60 g/l of a dispersion of an acrylate copolymer containing perfluoroalkyl chains and having a fluorine content of about 40% by weight in the solid and about 30% by weight of solid, relative to the total dispersion; the copolymer contains polyethylene oxide methacrylate having reactive OH groups, as is described in EP 312,964, 6 g/l of zinc nitrate as a catalyst for the dimethylolethyleneurea.

| Assessment | Example 6 | Comparison D |
|---|---|---|
| Oil repellency | | |
| Original | 6 | 6 |
| After 1× washing | 6 | 4 |
| After 5× washing | 6 | 2 |
| Soil release (mark) | | |
| Original | 3 | 3 |
| After 5× washing | 4 | 5 |
| Soil redeposition | | |
| After 1× washing | 58.7 | 31.6 |
| After 5× washing | 40.1 | 30.8 |

What is claimed is:

1. Compositions for obtaining wash- and cleaning-resistant textile finishes comprising reactive copolymers and/or condensates containing OH or O—$C_1$–$C_3$-alkyl groups as reactive groups and having perfluoroalkyl groups, and from 3 to 500% by weight, relative to the reactive copolymers and/or condensate containing perfluoroalkyl groups, water-dispersible, non-blocked polyisocyanate mixtures as crosslinking agents; said polyisocyanate mixtures containing isocyanate terminated species formed from the reaction product of a polyisocyanate component with a mono- or polyhydric polyalkylene oxide polyether alcohol component, said reaction product comprising:

a) an average NCO functionality of 1.8 to 4.2,
   b) a content of (cyclo)aliphatically bonded isocyanate groups (calculated as NCO, molecular weight=42) of 12.0 to 21.5% by weight, and
   c) a content of ethylene oxide units arranged in polyether chains (calculated as $C_2H_4O$, molecular weight=44) of 2 to 20% by weight, the polyether chains on a statistical average containing from 5 to 70 ethylene oxide units.

* * * * *